F. HACHMANN.
PISTON RING.
APPLICATION FILED DEC. 5, 1918.

1,348,640.

Patented Aug. 3, 1920.

Inventor:
Frederick Hachmann
By Edward E. Longan
atty.

UNITED STATES PATENT OFFICE.

FREDERICK HACHMANN, OF ST. LOUIS, MISSOURI, ASSIGNOR OF ONE-HALF TO HERMAN STIEFEL, OF ST. LOUIS, MISSOURI, ONE-EIGHTH TO DAVID M. HUTCHINSON, OF FERGUSON, MISSOURI, AND ONE-SIXTEENTH TO PHILIP E. MOODY, ONE-SIXTEENTH TO CHAUNCEY R. WATSON, AND ONE-SIXTEENTH TO H. A. WRIGHT, ALL OF DETROIT, MICHIGAN.

PISTON-RING.

1,348,640.

Specification of Letters Patent.

Patented Aug. 3, 1920.

Application filed December 5, 1918. Serial No. 265,381.

*To all whom it may concern:*

Be it known that I, FREDERICK HACHMANN, a citizen of the United States, and resident of St. Louis and State of Missouri, have invented certain new and useful Improvements in Piston Rings, of which the following is a specification containing a full, clear, and exact description, reference being had to the accompanying drawings, forming a part thereof.

This invention relates to improvements in piston rings and has for its object a piston ring composed of two sections and riveted together, thus forming practically a solid ring. A further object is to make a piston ring of two sections which sections are riveted together in such a manner that the slit portions of the ring are not opposite each other and at the same time none of the resiliency of the ring is lost. A further object is to provide a two piece ring, the parts of which may be cut from a long tube which has been turned and bored to the proper size, slitting these portions and then riveting the same together on one side only, thus allowing free expansion and at the same time holding the rings tightly together.

Figure 1:
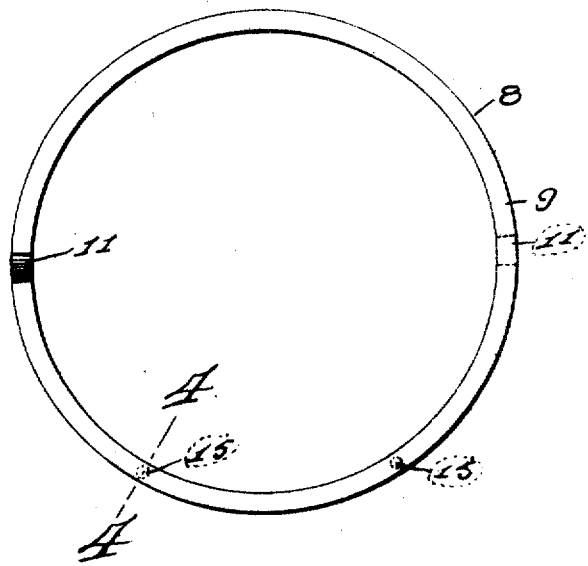
Figure 1 is a plan view of my ring completed.
Figure 2:
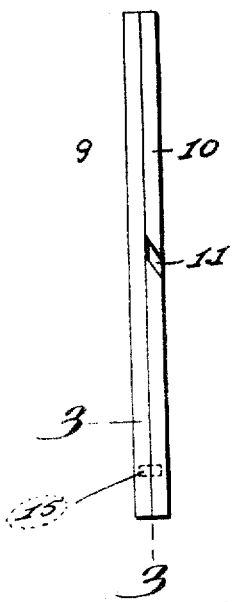
Fig. 2 is an edge view of the same.
Figure 3:
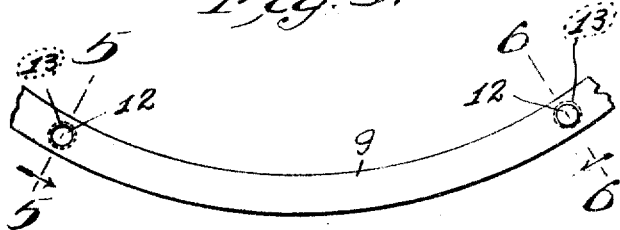
Fig. 3 is an enlarged view of the ring showing points of riveting taken on the line 3—3 of Fig. 2.
Figure 4:
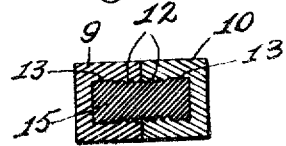
Fig. 4 is a cross-sectional view taken on the line 4—4 of Fig. 1.
Figure 5:
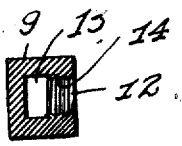
Fig. 5 is a cross-sectional view of one of the sections of the ring, showing the rivet bore taken on the line 5—5 of Fig. 3.
Figure 6:
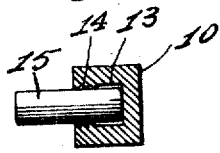
Fig. 6 is a cross-sectional view of one of the sections of the ring showing the rivet inserted in the rivet bore taken on the line 6—6 of Fig. 3.

In carrying out my invention, I provide a piston ring 8 composed of two sections 9 and 10, each section being provided with a diagonal slot or open space 11. On the inner face of each ring, I form an opening 12, which is provided at its bottom end with an enlargement 13 and the upper portion with screw threads 14. In this opening 12 is placed a rivet 15, which is of a size so as to fit easily within the opening 12. This rivet is composed of a material softer than the material out of which the ring is formed.

Figure 7:
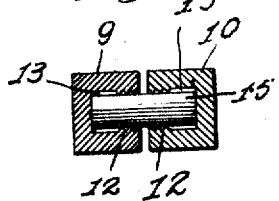
Fig. 7 is a cross-sectional view of both parts of the ring with the rivet interposed between, before the rivet has been set.

Each of the rings is provided with two of these openings, both openings being on the same half of the ring and approximately two inches apart, thus allowing expansion on the other parts of the ring. In each of these openings a rivet 15 is placed, the length of the rivet being slightly more than the combined depth of two opposite holes. This is clearly shown in Fig. 7. The ring is then placed in a press which may be either hydraulic, or operated in any other well known manner and when pressure is exerted on the two sections of the ring the rivet will swell and fill the threads 14 and the under-cut portion 13, thus securely locking the parts of the ring together and at the same time allowing it to retain its full resiliency. By the use of my invention both sections may be ground on all four surfaces and the same when secured together form practically a long lap one piece ring.

Having fully described my invention, what I claim is:

1. A piston ring composed of two independent and finished rings each of which is slitted and the slitted opening of one ring being overlapped by the body portion of the other ring, the contacting faces of each ring being provided with a bore passing partially through the ring, and a soft metal rivet located in the bores for connecting said rings together, said rivet forming an invisible connection in the completed ring.

2. A piston ring composed of two independent and finished rings, said rings being slitted and the slit of one ring overlying the body of the other ring, bores formed partially through the contacting faces of each ring, soft metal rivets located in said bores having their ends upset for drawing the rings together, said bores and rivets affording an invisible connection in the completed ring.

3. A piston ring composed of two finished slitted rings the body portion of one ring spanning the slit in the other ring, bores located in the inner face of each ring extending partially through the ring, the bores in each ring being vertically opposite the bores in the other ring, an under-cut portion located at the bottom of each bore, threads formed in the upper portion of each bore, a rivet of soft material inserted in the pair of bores and means for expanding the rivets into the under-cut and threaded portion of the bores for binding the ring securely together.

4. A piston ring composed of two independent finished sections slit so as to form a diagonal slot between the ends of each section, each section being provided with a screw threaded bore, which bores coincide when the sections are placed together, and said slots being so located, that the slot formed between the ends of one section will be overlapped by the body portion of the other section, whereby the lapped portions of the ring are not reduced and the combined resiliency of both sections are practically preserved, and a rivet seated in said bores.

In testimony whereof, I have signed my name to this specification, in the presence of two subscribing witnesses.

FREDERICK HACHMANN.

Witnesses:
  HARRY W. LANG,
  WALTER C. STEIN.